(12) United States Patent
Schleier-Smith

(10) Patent No.: US 8,756,163 B2
(45) Date of Patent: Jun. 17, 2014

(54) SYSTEM AND METHOD OF SELECTING A RELEVANT USER FOR INTRODUCTION TO A USER IN AN ONLINE ENVIRONMENT

(75) Inventor: Johann Schleier-Smith, San Francisco, CA (US)

(73) Assignee: Tagged, Inc., San Francisco, CA (US)

( * ) Notice: Subject to any disclaimer, the term of this patent is extended or adjusted under 35 U.S.C. 154(b) by 187 days.

(21) Appl. No.: 13/109,931

(22) Filed: May 17, 2011

(65) Prior Publication Data

US 2011/0225102 A1    Sep. 15, 2011

Related U.S. Application Data

(62) Division of application No. 12/407,746, filed on Mar. 19, 2009.

(51) Int. Cl.
*G06Q 99/00*    (2006.01)
(52) U.S. Cl.
USPC .......................................................... 705/319
(58) Field of Classification Search
CPC ....................................................... G06Q 50/01
USPC ........................................................... 705/319
See application file for complete search history.

(56) References Cited

U.S. PATENT DOCUMENTS

| | | | |
|---|---|---|---|
| 6,112,181 | A | 8/2000 | Shear et al. |
| 6,149,441 | A | 11/2000 | Pellegrino et al. |
| 6,285,999 | B1 | 9/2001 | Page |
| 6,306,033 | B1 | 10/2001 | Niwa et al. |
| 6,381,635 | B1 | 4/2002 | Hoyer et al. |
| 6,963,874 | B2 | 11/2005 | Kasriel et al. |
| 7,069,308 | B2 | 6/2006 | Abrams |
| 7,117,254 | B2 | 10/2006 | Lunt et al. |

(Continued)

FOREIGN PATENT DOCUMENTS

| | | |
|---|---|---|
| EP | 1574979 | 9/2005 |
| EP | 2270731 | 1/2011 |

(Continued)

OTHER PUBLICATIONS

Leskovec, Jure; Huttenlocher, Daniel; Kleinberg, Jon. Signed Networks in Social Media. Cornell University. CHI 2010, Apr. 10-15, 2010, Atlanta, Georgia, USA. <http://www.cs.cornell.edu/home/kleinber/chi10-signed.pdf>.*

(Continued)

*Primary Examiner* — Peter Choi
*Assistant Examiner* — Amanda Kirlin
(74) *Attorney, Agent, or Firm* — Perkins Coie, LLP

(57) ABSTRACT

Systems and methods of selecting a relevant user for introduction to a user in an online environment are disclosed. In one aspect, embodiments of the present disclosure include a method, which may be implemented on a system, of receiving a request to identify the relevant user to be introduced to the participating user in the social network, identifying a set of social history records that occurred among the multiple users in the social network, selecting, from the multiple users, the relevant user to be introduced to the participating user using the set of social history records. The relevant user that is selected is not a social connection of the participating user in the social network. One embodiment includes, determining whether the participating user is interested in meeting the relevant user in the social network based on an indication made by the participating user via interaction with the user device.

19 Claims, 15 Drawing Sheets

(56) References Cited

U.S. PATENT DOCUMENTS

| | | | |
|---|---|---|---|
| 7,149,977 | B2 | 12/2006 | Zaner et al. |
| 7,234,117 | B2 | 6/2007 | Zaner et al. |
| 7,249,123 | B2 | 7/2007 | Elder et al. |
| 7,269,590 | B2 | 9/2007 | Hull et al. |
| 7,359,894 | B1 | 4/2008 | Liebman et al. |
| 7,366,759 | B2 | 4/2008 | Trevithick et al. |
| 7,373,606 | B2 | 5/2008 | Gorzela |
| 7,433,876 | B2 | 10/2008 | Spivack et al. |
| 7,529,797 | B2 | 5/2009 | Tseng et al. |
| 7,756,926 | B2 | 7/2010 | Tseng et al. |
| 7,761,385 | B2 | 7/2010 | Hutchison et al. |
| 7,761,386 | B2 | 7/2010 | Teicher |
| 7,769,699 | B2 | 8/2010 | Teicher |
| 1,017,885 | A1 | 7/2011 | Tseng at al. |
| 7,974,868 | B2 | 7/2011 | Tseng et al. |
| 2001/0020231 | A1 | 9/2001 | Perri et al. |
| 2002/0042733 | A1 | 4/2002 | Lesandrini et al. |
| 2002/0103698 | A1 | 8/2002 | Cantrell |
| 2003/0115333 | A1 | 6/2003 | Cohen et al. |
| 2003/0208578 | A1 | 11/2003 | Taraborelli et al. |
| 2004/0003038 | A1 | 1/2004 | Huang et al. |
| 2004/0093266 | A1 | 5/2004 | Dohring |
| 2004/0119760 | A1 | 6/2004 | Grossman et al. |
| 2005/0021750 | A1 | 1/2005 | Abrams |
| 2005/0160001 | A1 | 7/2005 | Lapre et al. |
| 2005/0216338 | A1 | 9/2005 | Tseng et al. |
| 2005/0235062 | A1 | 10/2005 | Lunt et al. |
| 2006/0121990 | A1 | 6/2006 | O'Kelley et al. |
| 2006/0242554 | A1 | 10/2006 | Gerace et al. |
| 2006/0282328 | A1 | 12/2006 | Gerace et al. |
| 2006/0287920 | A1* | 12/2006 | Perkins et al. ............ 705/14 |
| 2007/0100686 | A1* | 5/2007 | Murakami et al. ......... 705/10 |
| 2007/0282877 | A1 | 12/2007 | Fischer et al. |
| 2008/0046458 | A1 | 2/2008 | Tseng et al. |
| 2008/0052203 | A1 | 2/2008 | Beyer et al. |
| 2008/0098087 | A1 | 4/2008 | Lubeck |
| 2008/0098313 | A1 | 4/2008 | Pollack |
| 2008/0140650 | A1 | 6/2008 | Stackpole |
| 2009/0192861 | A1 | 7/2009 | Suzuki et al. |
| 2009/0241035 | A1 | 9/2009 | Tseng et al. |
| 2010/0088246 | A1 | 4/2010 | Lim |
| 2010/0198836 | A1* | 8/2010 | Glass et al. ............. 707/748 |
| 2010/0241580 | A1 | 9/2010 | Schleier-Smith |
| 2011/0178851 | A1 | 7/2011 | Tseng et al. |

FOREIGN PATENT DOCUMENTS

| | | | |
|---|---|---|---|
| JP | 2000066970 | A | 3/2000 |
| JP | 2005259074 | A | 9/2005 |
| JP | 2007328723 | A | 12/2007 |
| KR | 100643480 | B1 | 11/2006 |
| WO | WO-2008020992 | A2 | 2/2008 |
| WO | WO-2010107566 | A2 | 9/2010 |

OTHER PUBLICATIONS

Bannar, Karen J., "Its Catching"; V41n23; pp. IQ20-IQ26, Jun. 5, 2000; Dialog File 15.

Dunn, Dan T., Jr.; Probstein, Sidney C., Marketing High Tech Services, Review of Business v24n1; pp. 1-7, Winter 2003; Dialog file 15.

Final Office Action mailed Apr. 2, 2010 in U.S. Appl. No. 11/000,707, filed Nov. 30, 2004.

Final Office Action mailed Aug. 22, 2008 for Issued Patent No. 7,529,797, U.S. Appl. No. 11/829,719, filed Jul. 27, 2007.

Final Office Action mailed Feb. 3, 2011 in U.S. Appl. No. 11/000,707, filed Nov. 30, 2004.

Final Office Action mailed Jul. 21, 2011, for U.S. Appl. No. 12/407,746, filed Mar. 19, 2009.

International Search Report PCT/US07/17051 Dated May 27, 2008; pp. 1-2.

International Search Report PCT/US2010/025461 dated Sep. 28, 2010 pp. 1-3.

Non-Final Office Action mailed Dec. 31, 2008 for Issued Patent No. 7,529,797, U.S. Appl. No. 11/829,719, filed Jul. 27, 2007.

Non-Final Office Action mailed Feb. 4, 2011 for U.S. Appl. No. 12/407,746, filed Mar. 19, 2009.

Non-Final Office Action mailed Jul. 23, 2010 in U.S Appl. No. 11/000,707, filed Nov. 30, 2004.

Non-Final Office Action mailed May 21, 2008 for Issued Patent No. 7,529,797, U.S. Appl. No. 11/829,719, filed Jul. 27, 2007.

Non-Final Office Action mailed Nov. 16, 2009 in U.S Appl. No. 11/000,707, filed Nov. 30, 2004.

Notice of Allowance mailed Mar. 4, 2011 in U.S. Appl. No. 11/000,707, filed Nov. 30, 2004.

Notice of Allowance mailed Mar. 6, 2009 for Issued Patent No. 7,529,797, U.S. Appl. No. 11/829,719, filed Jul. 27, 2007.

Notice of Allowance mailed Apr. 8, 2010 for Issued Patent No. 7,756,926, U.S. Appl. No. 12/422,155, filed Apr. 10, 2009.

Restriction Requirement mailed Dec. 9, 2010 for U.S. Appl. No. 12/407,746, filed Mar. 19, 2009.

Restriction Requirement mailed Jun. 23, 2009 in U.S. Appl. No. 11/000,707, filed Nov. 30, 2004.

U.S. Appl. No. 11/000,707, filed Nov. 30, 2004, Issued Patent No. 7,974,868.

U.S. Appl. No. 11/829,719, filed Jul. 27, 2007, Issued Patent No. 7,529,797.

U.S. Appl. No. 12/407,746, filed Mar. 19, 2009.

U.S. Appl. No. 12/422,155, filed Apr. 10, 2009, Issued Patent No. 7,756,926.

U.S. Appl. No. 13/026,970, filed Feb. 14, 2011.

U.S. Appl. No. 60/552,406, filed Mar. 10, 2004.

U.S. Appl. No. 60/838,459, filed Aug. 16, 2006.

U.S. Appl. No. 61/513,932, filed Aug. 1, 2011.

Written Opinion PCT/US07/17051 dated May 27, 2008; pp. 1-5.

Written Opinion PCT/US2010/025461 dated Sep. 28, 2010 pp. 1-6.

Co-pending U.S. Appl. No. 13/549,105, filed Jul. 13, 2012.

European Search Report European Publication No. EP 2270731 A1 dated Nov. 23, 2010, 1 page.

European Search Report European Publication No. EP 1574979 A1 dated Jun. 7, 2005, 1 page.

Office Action dated Mar. 8, 2013 for Japanese Patent Application No. 2012-500817 filed Feb. 25, 2010, 4 pp., with English translation 5 pp.

Office Action dated Mar. 6, 2013 for Korean Patent Application No. 10-2011-7023714 filed Feb. 25, 2010, 24 pp., with English translation 6 pp.

Office Action dated Jan. 20, 2012, for Canadian Patent Application No. 2,660,825 filed Jul. 30, 2005, 3 pp.

Examiner's Report dated Sep. 25, 2012, for Australian Patent Application No. 2010226195 filed Feb. 25, 2010, 4 pp.

Non-Final Office Action mailed Apr. 18, 2013, for U.S. Appl. No. 13/549,105 by Tseng, G., et al., filed Jul. 13, 2012.

Non-Final Office Action mailed Feb. 17, 2012, for U.S. Appl. No. 13/026,970 by Tseng, G., et al., filed Feb. 14, 2011.

Final Office Action mailed Dec. 14, 2012, for U.S. Appl. No. 13/026,970 by Tseng, G., et al., filed Feb. 14, 2011.

Non-Final Office Action mailed Aug. 8, 2013 for U.S. Appl. No. 13/549,105 by Tseng, G., filed Jul. 13, 2012.

Notice of Allowance mailed Dec. 13, 2013 for U.S. Appl. No. 13/549,105 by Tseng, G., filed Jul. 13, 2012.

* cited by examiner

| Node 352 | Frequency Counter 354 | Score 356 | Rank 358 |
|---|---|---|---|
| Node 1 | N/A | N/A | N/A |
| Node 2 | 52,526 | 185 | 1 |
| Node 3 | 12,311 | 125 | 4 |
| Node 4 | 30,125 | 132 | 3 |
| Node 5 | 10,266 | 115 | 5 |
| Node 6 | 42,621 | 160 | 2 |
| Node 7 | 0 | 0 | N/A |
| Node 8 | 8,132 | 109 | 6 |
| Node 9 | 6,213 | 87 | 7 |
| Node 10 | 0 | 0 | N/A |
| Node 11 | 0 | 0 | N/A |
| Node 12 | 0 | 0 | N/A |

350

Social History Records

| Interactions/Connections 410 | Weighting Factor 420 |
|---|---|
| Social connection | 0.23 |
| Sending/Receiving a message | 0.58/0.11 |
| Viewing a profile/Profile is viewed | 0.51 |
| Posting/Receiving a comment | 0.65 |
| Sending/Receiving an invitation | 0.31 |
| Joining a group | 0.12 |
| Belonging to a group | 0.08 |
| Creating a group | 0.05 |

| Home | Profile ▼ | Friends ▼ | Messages ▼ | Browse | Search | account | help | support |

Photos • Video • Poker • Chat • Tags • Luv • Wink • Meet Me • Pets • SuperPoke • More.... — 502

Jump to .... ▼

☐ Add Photos
☐ Add a Widget
☐ Add Videos
☐ Write in Journal
☐ Edit Profile
☐ Change Skin
☐ New Box
☐ Friend's View ○ Jane D

Jane D is playing meet me! 1 hour ago  edit  clear — 504

550

0%

512

Profile URL: http://www.tagged.com/  [Select a URL]  Save — 506

Last Active: Online now!
Profile Views: 0 times
Profile Skin: Default
Tagline: Select...

Gender: Female
Location: Menlo Park, CA
Birthdate: October 17
Relationship Status: Select...
Interested In: Friends, Networking
Languages: German, English
Orientation: Straight Junior High School: Boston University Academy
High School: David Starr Jordan Sr. High '91
College: Santa Barbara City College '95

About Me — 508

Music: Add your favorite music types and artists...
Movies: Add your favorite movies and actors...
TV: Add your favorite TV shows...
Books: Add your favorite books and authors...
Sports: Add your favorite sports, teams, & athletes...
Interests: Add your interests...
Dreams: Share your dreams...
Best Features: Don't be shy...
About Me: Write anything you want... — 510
Add more fields...

Photos
View all 1 photos • Add Photos • Make a Slideshow

Display 10 ▼

Friends
No friends • Invite Friends

Display 10 ▼

Gifts
No gifts

Autoplay Off ▼

Videos
No videos • Add Videos

Display 8 ▼

Tags
No tags

Display 2 ▼

Journals
No journal entries • Write in Journal

What's New
View all updates                                             Display 10 ▼
Jane D updated her profile information. 1:36pm          X
Jane D is playing meet me! 1:30pm                        X
Jane D added a new photo. 1:24pm                         X

SYSTEM AND METHOD OF SELECTING A RELEVANT USER FOR INTRODUCTION TO A USER IN AN ONLINE ENVIRONMENT

CROSS-REFERENCE TO RELATED APPLICATION

This application is a Divisional Application of U.S. patent application Ser. No. 12/407,746, filed Mar. 19, 2009, entitled "Method and System of Selecting a Relevant User for Introduction to a User in an Online Environment" also by Johann M. Schleier-Smith which is incorporated herein by reference.

BACKGROUND

Social networks in online environments are increasingly relied upon by individuals to engage and participate in various types of social activities and behaviors. For example, individuals use online social networks to facilitate friendly, casual, romantic, business relationships and to maintain connections and initiate dialogues with others. In the escalating pace of life in the modern world, prevalence of high speed network connections to the Internet, availability of mobile devices with wireless capabilities, the online environment has become one of the dominating mechanisms through which people communicate and connect with one another.

For example, online social networks are increasingly used by many individuals of all ages and demographic groups, to stay in touch and to stay connected with existing friends, family members, business colleagues. Online social networks are also increasing used to build a connection with an acquaintance or potential business partner. Additionally, via online social networks, users can join common interest groups meet others with similar interests and/or have access to updated contact information of contacts, friends, and/or acquaintances. The already vast and continuously growing user-base of online social networks further enhances the user experiences due to the amount of relationship data and interaction data of users that can be collected and utilized.

BRIEF DESCRIPTION OF THE DRAWINGS

FIG. 4 illustrates an example table depicting the weighting factors assigned to the different types of interactions/connections that occurred in a social network in an online environment, according to one embodiment.

FIG. 5 illustrates an example user interface showing a user-profile page, according to one embodiment.

DETAILED DESCRIPTION

Figure 1:
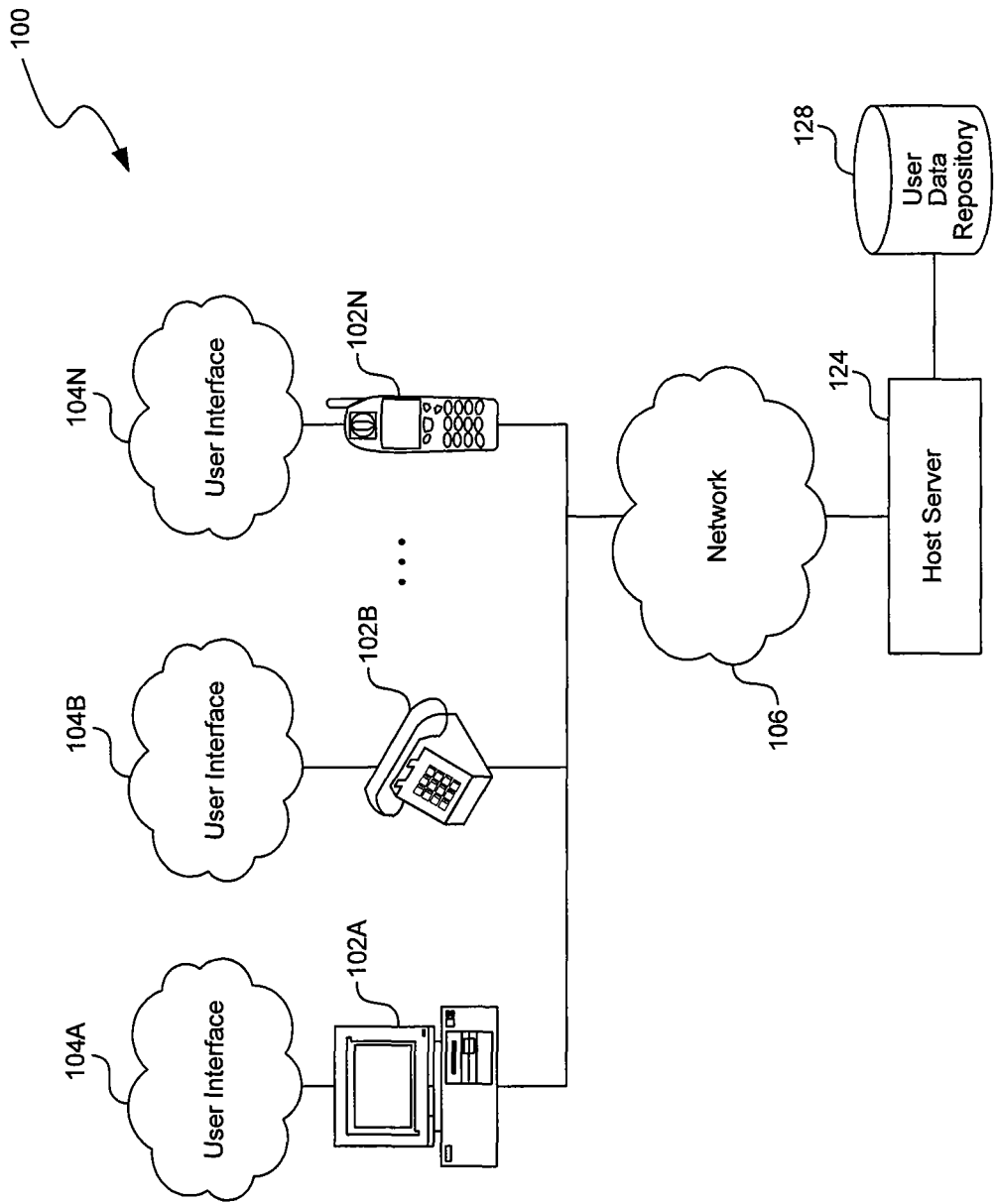
FIG. 1 illustrates a block diagram of client devices or user devices able to communicate with the host server for selecting relevant users to be introduced to a user in an online environment, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for selecting a relevant user for introduction to a user in an online environment.

FIG. 1 illustrates a block diagram of client devices or user devices 102A-N able to communicate with the host server 124 for selecting relevant users to be introduced to a user in an online environment, according to one embodiment.

The plurality of client devices or user devices 102A-N can be any system and/or device, and/or any combination of devices/systems that is able to establish a connection with another device, a server and/or other systems. The client devices or user devices 102A-N typically include display or other output functionalities to present data exchanged between the devices to a user. For example, the client devices and content providers can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, client devices or user devices 102A-N are coupled to a network 106. In some embodiments, the devices 102A-N may be directly connected to one another.

The network 106, over which client devices or user devices 102A-N and the host server 124 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices or user devices 102A-N and host server 124 and may appear as one or more networks to the serviced systems and devices. In one embodiment, communications to and from client devices or user devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The user data repository 128 can store software, descriptive data, images, system information, drivers, and/or any other data item utilized by other components of the host server 124 and/or any other servers for operation. The user data repository 128 may be coupled to the host server 124. The user data repository 128 may be managed by a database management system (DBMS), for example but not limited to, Oracle, DB2, Microsoft Access, Microsoft SQL Server, PostgreSQL, MySQL, FileMaker, etc.

The user data repository 128 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 124 is able to provide data to be stored in the user data repository 128 and/or can retrieve data stored in the user data repository 128. The user data repository 128 can store static user data, including user information of the users in the online social network. For example, static user data can include descriptive data of personal information such as, but is not limited to, a first name and last name of the user, a valid email ID, a unique user name, age, marital status, occupation, location, education, home town, schools attended, number of siblings, heritage, ethnicity, race, etc. The user information further includes interest information, which may include, but is not limited to, activities, hobbies, professional information, photos, etc.

In one embodiment, user data stored in user data repository 128 is explicitly specified by the user. For example, when the user (e.g., visitor/service subscriber) signs up for services such as social networking related services, a set of information may be required, such as a valid email address, an address of service, a valid credit card number, social security number, a username, and/or age. The user information form can include optional entries, by way of example but not limitation, location, activity, hobbies, ethnicity, photos, etc. Examples of user data stored in the user data repository 128, including, but is not limited to, user name, user occupation/position, user address, subscription information, hardware ID, hardware model, software version ID, etc.

The user data repository 128 can also store dynamic user data. Dynamic user data can either be explicitly submitted by the user or provided via one or more software agents and/or hardware modules such as the host server 124 coupled to the user data repository 128. For example, a user can periodically update his/her user profile which can be stored in the user data repository 128. Similarly, user preferences can be automatically identified and stored in the repository. In some embodiments, dynamic information such as user interactions, relationships with other users, user connections, social records, social history records, and/or any communication records can be recorded and stored in the user data repository 128.

Figure 2:
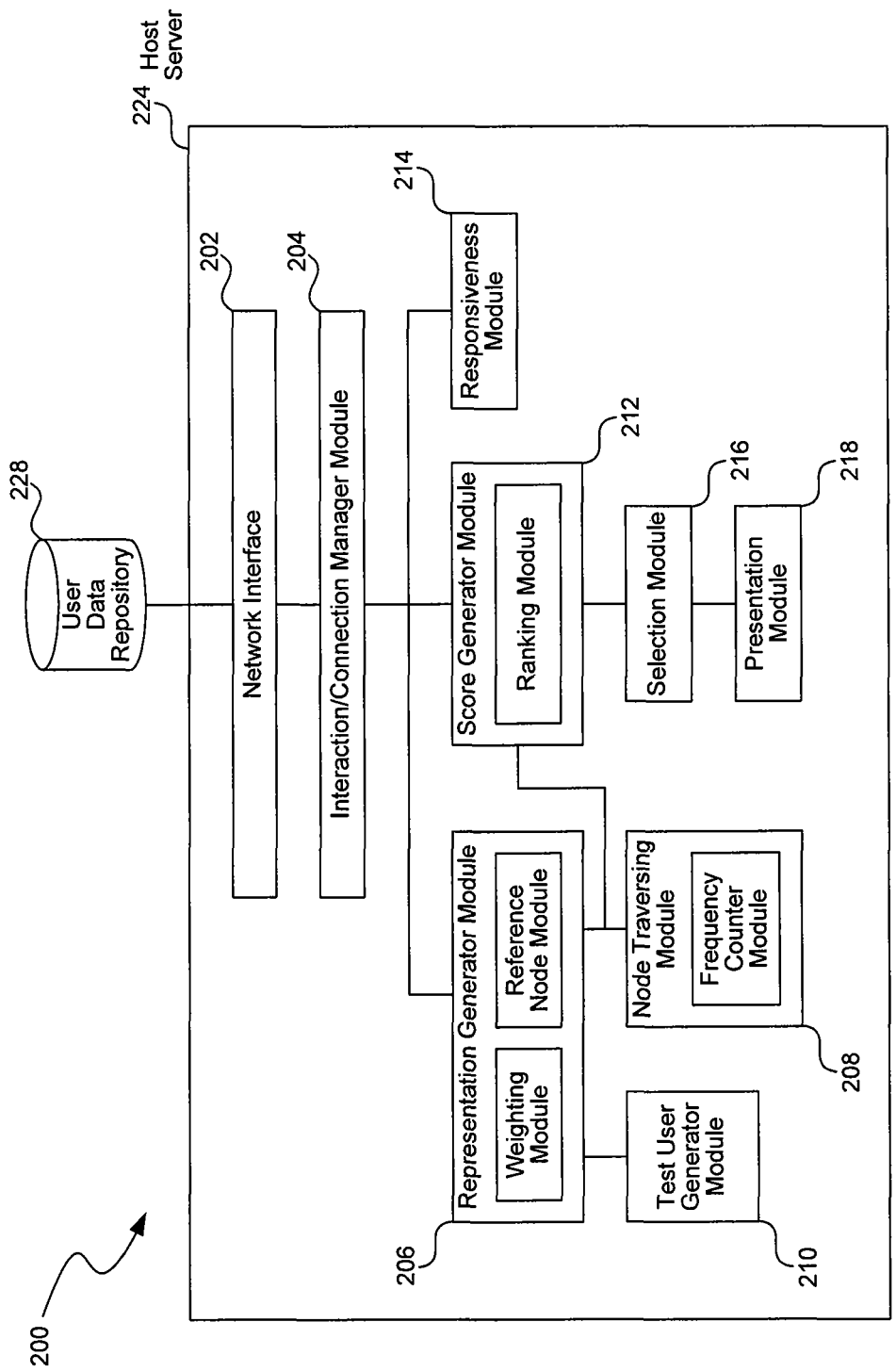
FIG. 2 depicts a block diagram of the components of a host server that selects relevant users for introduction to a user in an online environment, according to one embodiment.

FIG. 2 depicts a block diagram of the components of a host server 224 that selects relevant users for introduction to a user in an online environment, according to one embodiment.

The host server 224 includes a network interface 202, an interaction/connection manager module 204, a representation generator module 206, a node traversing module 208, a test user generator module, a score generator module 212, a responsiveness module 214, a selection module 216, and/or a presentation module 218. In one embodiment, the host server 224 is coupled to a user data repository 228. The user data repository is described with further reference to the example of FIG. 1.

Additional or less modules can be included without deviating from the novel art of this disclosure. In addition, each module in the example of FIG. 1 can include any number and combination of sub-modules, and systems, implemented with any combination of hardware and/or software modules.

The host server 224, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 2, the network interface 202 can be a networking device that enables the host server 224 to mediate data in a network with an entity that is external to the host server, through any known and/or convenient communications protocol supported by the host and the external entity. The network interface 202 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

One embodiment of the host server 224 includes an interaction/connection manager module 204. The interaction/connection manager module 204 can be any combination of software agents and/or hardware modules able to identify, detect, track, manage, record, and/or process an occurrence of an interaction, an action, a relationship, an existing connection, and/or a requested connection.

The interaction/connection manager module 204, when in operation, is able to communicate with the network interface 202 to identify and detect a set of social interactions or social connection that occurred among multiple users in an online social network. In general, the social interactions that occurred in the online social network are initiated by users using client devices or user devices (e.g., a cell phone, a telephone, a SmartPhone, a PDA, an iPhone, a Blackberry, a computer, a laptop, and/or a Palmtop, etc.). Any type of connections or interactions can be detected and subsequently tracked and/or recorded for further processing and analysis. The types of connections/social connections can include relationships of various types (e.g., friendship, collegial, family, romantic, etc.) or relationships/connections of unspecified types. A connection in an online social network generally refers to users who have requested and accepted a connection request and are thus mutually connected.

The interactions/actions that occur in an online social network can include by way of example, but not limitation, sending or receiving an invitation to establish a social connection in the social network, sending or receiving a message, viewing a profile, posting a comment, posting information, joining a group, sending or receiving an invitation to an event or party, belonging to a group, creating a group, etc. The interaction/connection manager module 204 records these actions and determines the sender and recipient of these actions. If the action pertains to a group, the interaction/connection manager module 204 also determines and stores the associated group.

In one embodiment, the social interactions detected by the interaction/connection manager module 204 also includes sending a notification of interest, receiving a notification of interest, and/or responding to a notification of interest. For example, a notification of interest may be sent to a relevant user identified for a particular user when the particular user has indicated interest. The relevant user may respond to the notification if also interested in the particular user. Note that the notifications of interest send to the particular user may be anonymous or non-anonymous. These interactions are also tracked by the interaction/connection manager module 204.

In one embodiment, the interaction/connector module 204 determines the date/time of the occurrence of the event and stores the timestamp associated with the occurrence. The date and/or time associated with the occurrence of the event could be factored into determining weights of each interaction in selecting relevant users for a particular user. For example, a set of older events may generally weight less than more newly occurred events. In one embodiment, the weights assigned to events decrease exponentially, quadratically, or linearly with time.

One embodiment of the host server 224 includes a representation generator module 206. The representation generator module 206 can be any combination of software agents and/or hardware modules able to generate a representation of the social connections and social history records that occurred in an online social network among users for further processing.

The representation generator module 206, when in operation, establishes a communication session with the interaction/connection manager module 204, to access all or a portion of the connections/interactions managed and tracked by the interaction/connection manager module 204. The representation generator module 206 could apply a filter (e.g., time specific, user specific, event specific, type of connection, etc.) in retrieving the relevant connections/interactions for constructing the representation and for further processing.

For example, the relevant connections/interactions that occurred in the last two months or the relevant connection/interactions that pertain to one or more specific users. Alternatively, connections/interactions may be retrieved from the interaction/connection manager module 204 without filtering or pre-selecting.

Using the connections/interactions, the representation generator module 206 can generate a representation of the set of social interactions. In the representation, the representation generator module 206 assigns each of the multiple users to correspond to a node (e.g., a user node), where the user for whom relevant users are to be identified corresponds to an origin node. In addition, the representation generator module 206 assigns each of the set of social interactions to correspond to a node-connecting edge and where the origin node corresponds to a set of origin node-connecting edges.

In the representation, two user nodes can be connected by edges that represent social interactions or social connections (e.g., relationships) that occurred and/or exist between the two users represented by the two user nodes. The representation is further illustrated graphically and described with further reference to the example of FIG. 3A-3B.

In one embodiment, the representation generator module 206 assigns weighting values to the edges that represent social interactions and social connections. The weighting values can be assigned based on the type of interaction, type of relationship, when the interaction last occurred, and/or the duration of a relationship. The weighting values can be used when selecting an edge of a particular node to compute relevancy scores of users in the social network. A higher weighting value, if used, typically corresponds to a higher selection probability of that particular edge. The assignment of weighting values and use for computing statistical attributes of the representation are described with further reference to the example of FIG. 3A and FIG. 8A-8B. In one embodiment, the weighting values are assigned by a weighting module.

In one embodiment, a subset of the user nodes is selected as reference nodes such that the dimensions of the representation can be reduced to reduce resource intensity of the computations. The distances between the reference nodes and the other nodes in the representation can be calculated such that the distance between any two nodes in the representation can be determined using linear combinations (e.g., weighted combinations) of the distances computed using the reference nodes. Thus, the distance of any two nodes can be determined using explicit computations performed using the selected reference nodes as opposed explicit computations including those of all nodes. Vector addition or subtraction can be used to perform the linear or weighted combination. In one embodiment, the reference node module selects the reference nodes and performs the distance computation using the reference nodes.

Dimensional reduction achieved by using reference nodes can become particularly beneficial with increasing numbers of users for whom relevant users are to be identified, for example, in real time or near-real time. The reference node generator module can decrease the number of computations needed to identify relevant users and as a result, perform the computations quicker and more frequently to improve and optimize user experience in the online social network.

One embodiment of the host server 224 includes a node traversing module 208. The node traversing module 208 can be any combination of software agents and/or hardware modules able to process, manage, and review the representation generated by the representation generator module.

The node traversing module 208 is coupled to the representation generator 206. When in operation, the node traversing module 208 is able to select one of the edges connected to a particular node in the representation of the social interactions. Initially, the node traversing module 208 selects an origin node-connecting edge from a set of origin node-connecting edges of the origin node that corresponds to the user for whom relevant users are to be identified. The origin node-connecting edge could be randomly selected or selected according to a prescribed function, for example, one that factors into any weighting values assigned to the node-connecting edges.

Once an origin node-connecting edge has been selected, the node traversing module 208 identifies a connected intermediary node with which the selected origin node-connecting edge connects. The node traversing module 208 can thus increase a frequency counter associated with the connected intermediary node that is identified. The node traversing module 208 continues the process of selecting edges and identifying connected nodes. Once the node traversing module 208 identifies a connected node, also increases the frequency counter of the connected node. In one embodiment, the frequency counter is tracked and incremented by the frequency counter module.

The frequency that each node can be reached by traversing edges connecting from the origin node and any intermediate nodes corresponds to the relevancy of the associated users to the user who is represented by the origin node. Therefore, a relevancy score for each user can be generated using the frequency counters of each of the nodes associated with each of the multiple users. Generally, a user with a higher relevancy score corresponds to a node having higher frequency counter.

One embodiment of the host server 224 includes a test user generator module 210. The test user generator module 210 can be any combination of software agents and/or hardware modules able to build hypothetical user profiles of test users in an online social network.

The test user generator module 210 is, in one embodiment, coupled to the representation generator module 206. When in operation, the test user generator module 210 generates hypothetical user profiles of test users. These test users may be introduced in the representation of social interactions as user nodes with edges connected to real users and other test users.

The test users with hypothetical user profiles can be presented to real users by the test user generator module 210 in the social network to learn user behavior. The test users can be presented as test users to identify the types of interactions that they may trigger from real users. These test users may be introduced in the representation of social interactions as user nodes and the interactions may also be introduced as edges. The test users and the interactions that real users initiate with the test users provide additional data with which the system can optimize selection of relevant users.

One embodiment of the host server 224 includes a score generator module 212. One embodiment of the score generator module 212 includes a ranking module. The score generator module 212 can be any combination of software agents and/or hardware modules able to generate relevancy scores for multiple users based on their relevancy to a particular user using interactions/connections that occurred in an online social network.

The score generator module 212 is coupled to the interaction/connection manager module 204 and/or the node traversing module 208. In operation, the score generator module 212 communicates with the interaction/connection manager module 204 generates relevancy scores for each of the multiple users using the set of social interactions and/or social connections that occurred among the multiple users in the online social network.

In one embodiment, the score generator module 212 communicates with the node traversing module 208 to determine how frequently each node can be reached from an origin node by traversing connected edges. Using the frequency data (e.g., frequency counter) obtained from the node traversing module 208, the score generator module 212 can generate relevancy scores based on the frequency information associated with the user nodes.

In one embodiment, the score generator module 212 uses the frequency counters associated with the nodes to rank the associated users. In general, users associated with nodes having higher frequency counters are ranked higher. In one embodiment, the ranking of users based on relevancy is determined by the ranking module. A table depicting an example of user nodes and associated frequency counters, scores, and rank is illustrated with further reference to the example of FIG. 3C.

In one embodiment, the rankings of the relevant users also factor in when the user was last active (e.g., when the user last logged on) online in the social network. In one embodiment, the assignment of rankings of the relevant users also considers the frequency with which users log on to the online social network. The users may be ranked on a continuous scale based on the last time they were logged on, the frequency with which they log on to the social network, or a combination of last active time and frequency. For example, for five users with similar relevancy scores, the user that has most recently logged on, or the user that most frequently logs on, or a combination thereof, is the most highly ranked. Whereas, the user that logs on least frequently or the user whose last logon is the further in the past, and/or a combination thereof, may be the lowest ranked relevant user.

Alternatively, the users may be categorized on a binary scale. For example, the users that have not logged on for a period of time (e.g., over a month, over two months, over 6 months, etc.) may simply not be ranked and removed from the list of relevant users to be presented since these users may not respond to a notification of interest. The users that have logged on at least once recently (e.g., last two days, last week, or last two weeks) may be retained on the list. In this instance, how recent the last activity was may not have an effect on the particular ranking of the relevant user in addition to whether the user will be ranked and presented to other users.

In one embodiment, demographic information is used in scoring or ranking relevant users identified for a participating user. For example, demographic information of the participating user and the relevant users can be factors in determining the rank of each of the multiple relevant users. In one embodiment, demographic information is used when the participating user is relatively new in the social network and does not have that many interactions or connections with other users.

One embodiment of the host server 224 includes a selection module 216. The selection module 216 can be any combination of software agents and/or hardware modules able to select candidate users to be introduced to a participating user for example, based on relevancy to the particular user.

The selection module 216 is, in one embodiment, coupled to the score generator module 212. When, in operation, the selection module 216 is able to communicate with the score generator module 212 to determine the relevancy scores and/or rankings associated with nodes representing users and the relevancy of the associated users. The selection module 216 can then, using the relevancy scores and/or rankings, select a set of relevant users. The set of relevant users are selected for a particular user who is participating in the game or application.

Any number of relevant users can be identified or selected. For example, the relevant users may be selected as the users with scores in the top 15% range. The relevant users may also be selected as the top 200 ranking users or a rank in the top 10-15% range of all scored users.

In general, the selection module 216 selects relevant users that are not existing social connections of the user. Since the relevancy scoring process determines the likelihood that the user would be interested in meeting another person, people that the user has already met, can, in one embodiment, be excluded from the selection process.

One embodiment of the host server 224 includes a presentation module 218. The presentation module 218 can be any combination of software agents and/or hardware modules able to present to a user, the identified relevant users.

In one embodiment, the presentation module 218 is coupled the selection module 216 and the user data repository 228. When in operation, the presentation module 218 identifies user information of the users selected by the selection module 216 from the user data repository 228. The presentation module 218 electronically presents one or more of the relevant users to the user via a user device (e.g., computer, laptop, cell phone, Blackberry, iPhone, etc.). The presented information about the relevant users can include an image of the relevant user and/or biographical data of the relevant user. Note that the relevant users can be presented to the participating user in an order based on the ranking assigned to each of the multiple relevant users. The relevant users are presented to the participating user in a randomized order. In one embodiment, a predetermined number of relevant users are selected from the multiple relevant users and that the predetermined number of multiple relevant users is presented to the participating user in a randomized order.

One embodiment of the host server 224 includes a responsiveness module 214. The responsiveness module 214 can be any combination of software agents and/or hardware modules able to detect and track the responsiveness of users in the online social network to meeting requests or notifications of interest.

In one embodiment, the responsiveness module 214 is coupled to the interaction/connection manager module 204 to detect instances when users respond or do not respond to a notification of interest. By tracking user responses, the responsiveness module 214 can determine responsiveness of users in responding to notifications of interest from other users. In one embodiment, the responsiveness metric may be reduced if a user is presented to another user, regardless of whether a notification of interest was sent.

The responsiveness module 214 may further be coupled to the score generator module 212 such that, when in operation, the responsiveness module 214 can provide the score generator module 212 with responsiveness information of the users. In one embodiment, the responsiveness of each of the relevant users is a factor in determining their relevancy ranks and thus subsequently affecting the likelihood that they will be presented to another user.

In one embodiment, the responsiveness metric is computing using a linear combination of the number of times other users have indicated interest in a user and the number of times other users have indicated no interest in the user (e.g., a*number of yes_clicks_received+b*number of no_clicks_received). Therefore, the responsiveness metric of a user increases (less responsive) when presented to other users.

If the user has never participated in the game of meeting other people and being introduced to others (the applicant "Meet Me"), the responsiveness metric is set to c. The higher value the responsiveness metric is, the less responsive a user is. Note that a, b, and c may each be positive or negative. When a user participates in the game, for example, by responding to a notification of interest, the metric is decreased (e.g., reset to '0'). In this representation, a lower metric indicates a higher responsiveness. Note that in some embodiments, the responsiveness metric is used independently of the relevancy ranks of users to select users suitable for introduction to a participating user. In other words, the more a user participates in the "Meet Me" application by responding to notifications, the more frequently they can be presented to other users.

Figure 3A:
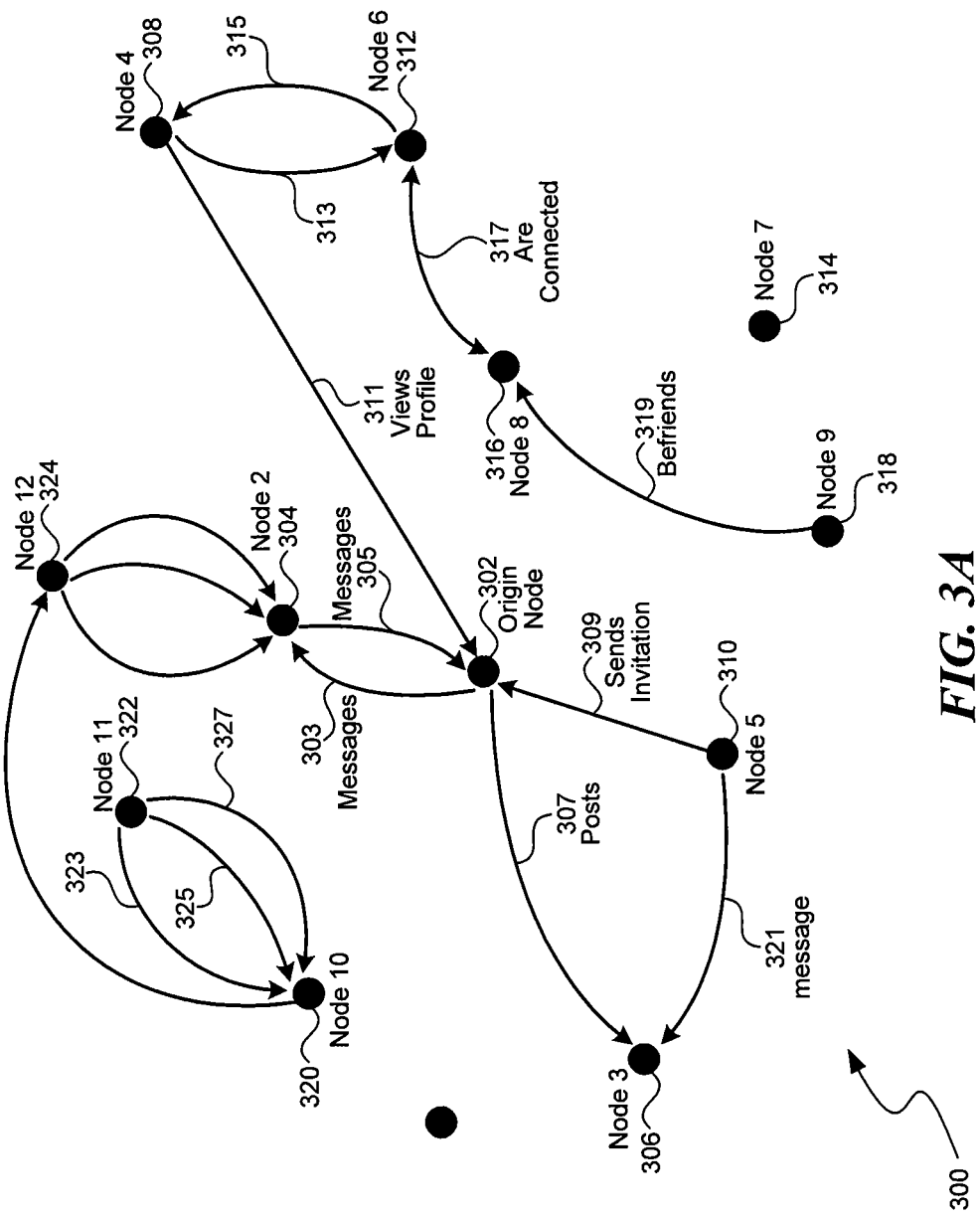
FIG. 3A depicts a diagram of an example representation of social interactions in a social network having multiple users, according to one embodiment.

FIG. 3A depicts a diagram of an example representation 300 of social interactions in an online social network having multiple users, according to one embodiment.

The representation 300 of social interactions, social connections, and/or social history records can be used to identify relevant users for a specific user. The representation 300 graphically depicts relationships, connections, interactions, and actions that exist or occur among the various users in the online environment. These connections and interactions could also be referred to as "social history" and the representation 300 can be used to track and maintain the "social history records" such that statistical attributes can be computed.

For example, a relationship could indicate that users are connected to one anther in the online network. The type of relationship could also optionally be specified (e.g., friend, acquaintance, colleague, family) in the online network. The representation 300 also includes graphical depictions of actions performed by users in the online social network. For example, actions can include social interactions, social records, social connections, initiation of social connections, etc.

In one embodiment, in the representation 300, each of the multiple users corresponds to a node (e.g., node 304, 306, 308, etc.) and the user for whom relevant users are to be identified corresponds to an origin node 302. Each of the social interactions can be represented by a node-connecting edge (e.g., edge 303, 305, 307, etc.). The source node 302 can be associated with a set of source node connecting edges (e.g., edges 303, 305, 307, 309, and 311).

The social interactions represented by edges can include an existing friendship connection among users in the network (e.g., edge 317). For example, two nodes connected by an edge could indicate that the two associated users are connected as friends in the online social network. Note that each occurrence of the same type of interaction that occurs between two users can each be represented by its own edge. For example, if the user of Node 111 322 sends 3 messages to user of Node 10 320, then each messaging event can be represented by its own edge (e.g., edges 323 325, and 327). Alternatively, the frequency of a particular action that occurred between two users can be represented by a weighting factor. For example, instead of using three edges (e.g., 323, 325, and 327), one edge with a tripled weighting factor could be used.

In addition, the social interactions could include sending a message to another user and/or receiving a message from another user (e.g., edges 303 and 305). For example, two nodes connected could indicate that the two associated users have had message exchanges. In one embodiment, the edge has a single arrow indicating which user is the sender and which user is the recipient of the message.

Furthermore, the social interactions can also include, viewing the profile of another user (e.g., edge 311), posting a comment on another user's home page (e.g., edge 307), and/or sending an invitation to another user (e.g., edge 309, an invitation to connect (be-friends), an invitation to join a group, etc.). For example, an edge connecting two nodes can indicate a viewer of a profile linked to the user whose profile is viewed. An arrow can be used in this instance to differentiate between the viewing and the viewed user. Alternatively, each edge can include two arrows or no arrows such that a sender and recipient are not distinguished in a social interaction except that it occurred. In one embodiment, an edge can be created when a user invites another user to connect as friends in the online social network or when a user posts a comment on another user's homepage.

In one embodiment, the social interaction further includes responding to a notification of interest sent from another user or sending a notification of interest to another user. Notifications of interest are typically generated in response to identification of relevant users. The relevant users are presented to a user and if the user indicates interest, a notification of interest can be sent to one or more relevant users notifying them that a user is potentially interested in them and has indicated as such in their response.

In one embodiment, the representation 300 is used in computing statistical attributes of the social history records. The statistical attributes can be used to select relevant users for a participating user. For example, the social interactions among multiple users can be to identify the relevant users in the online social network that are relevant to the user. In one embodiment, the relevant users are selected based on relevancy scores generated for each of the multiple users.

The relevancy scores can be generated by determining the frequency with which each node can be arrived at from the origin node 302 which represents the participating user for whom relevant users are to be identified. The nodes in the representation 300 are connected to edges which can be used to traverse from one node to another.

For example, to generate relevancy scores for multiple users based on their relevancy to the participating user (e.g., the user represented by the origin node 302), initially, one of the origin-node connecting edges is selected. The origin-node connecting edges include edge 303 (a sent message), edge 305 (a received message), edge 307 (posting a comment), edge 309 (a received invitation), edge 311 (viewed profile). In one embodiment, one of the origin-node connecting edges is randomly selected from the set of origin-node connecting edges. Other selection mechanisms, for example, biased selection using weighting factors, can be used as well.

Once an origin-node connecting edge has been selected, a connected intermediary node with which the selected origin node-connecting edge connects from is identified. For example, if the edge 307 (posting a comment) is selected, the connected intermediary node (Node 3) 306 is identified. The frequency counter of node 306 can thus be incremented.

The same process continues for a number of occurrences to determine how frequently each node can be arrived at by selecting edges that connect from node to node. The frequency with which each node can be arrived at after multiple edge selections and hopping from node to node using edge selections is related to the relevancy of each user associated with the nodes. The more frequently a node is arrived at, the higher relevancy the associated user has with the participating user who is associated with the origin node 302.

For example, from node 306, edge 307 or edge 321 can be selected to continue the computation process. If edge 321 is selected, the connected intermediary node (Node 5) 310 is identified as a connected node. The frequency counter for node 310 can thus be incremented. Therefore, in one embodiment, the node-connecting edges of each connected intermediary node with which a previously selected node-connecting edge is connected is selected and the frequency counters associated with each connected intermediary node is incremented.

After a number of occurrences (e.g., a thousand, ten thousand, a hundred thousand, a million), the frequency counter associated with each node is examined for further processing. An example of a table illustrating the frequency counter 354 associated with each node 352 is depicted in FIG. 3C. FIG. 3C illustrates an example table 350 depicting the frequency counters 354, score 356, and rank 358, associated with each user node 352 in a social network in an online environment, according to one embodiment. The relevancy scores of each of the multiple users can be generated using the frequency counters of each of the nodes, where a higher relevancy score generally corresponding to a higher frequency counter.

In one embodiment, the frequency counters are (only) incremented for the connected intermediary nodes selected at the odd number occurrences of the number of occurrences, when the selection of the origin node-connecting edge is considered as the first odd occurrence. Since, in general, users that are one edge away from the particular user is more likely to be one that the particular user is interested in meeting, whereas users that are two edges away is more likely to be a user similar to the particular user.

In one embodiment, weighting factors are assigned to some or all of the social history records and can be used to compute the statistical attributes. The weighting factors that are assigned can depend on the specific type of social interaction. For example, the sending or receiving of a message can be assigned a higher weighting factor than a social connection. The posting of a comment can also be assigned a higher weighting factor than a social connection.

An example of a table illustrating the types of interactions/connections that make up a social history record are illustrated in the example of FIG. 4. FIG. 4 illustrates an example table 400 depicting the weighting factors 420 assigned to the different types of interactions/connections 410 of social history records that occurred in an online social network, according to one embodiment. The weighting factors that are assigned to the different types of interactions/connections can be used in computing statistical attributes of the social history records. As illustrated, the weighting factor can be the same for each interaction and interaction recipient pair. For example, a comment post and receiving a comment post can be weighed the same. The weighting factor can also be different from each interaction and interaction recipient pair. For example, sending a message and receiving a message may be weighed differently.

The weighting factors can be used when selecting edges. For example, when selecting an origin node-connected edge from edge 303 (a sent message), edge 305 (a received message), edge 307 (posting a comment), edge 309 (a received invitation), and edge 311 (viewed profile), an edge with a higher weighting factor has a higher likelihood of being selected. In most instances, the weighting factors can be readjusted after assignment to improve efficacy.

In one embodiment, the weighting factors are adjusted based on the amount of time that has elapsed since the occurrence of a particular interaction or action. For example, for a friendship connection, the weighting factor may be increased (e.g., linearly, quadratically, exponentially) with the duration of the relationship. For an occurrence of a sent message, the weighting factor may be decreased (e.g., linearly, quadratically, exponentially) with amount of time that has elapsed since the message was sent.

The relevancy scores can also be generated using search parameters. The search parameters may be user specified and can include one or more of, demographics, keyword, most recent activity online, and/or location. In one embodiment, the relevancy score is generated as a weighted combination of the search parameter and the frequency counter.

In one embodiment, the representation of social interactions includes user groups. The user groups can also be represented as a node in the representation. An example of a representation of social interactions in a social network is illustrated in the example of FIG. 3B.

Figure 3B:
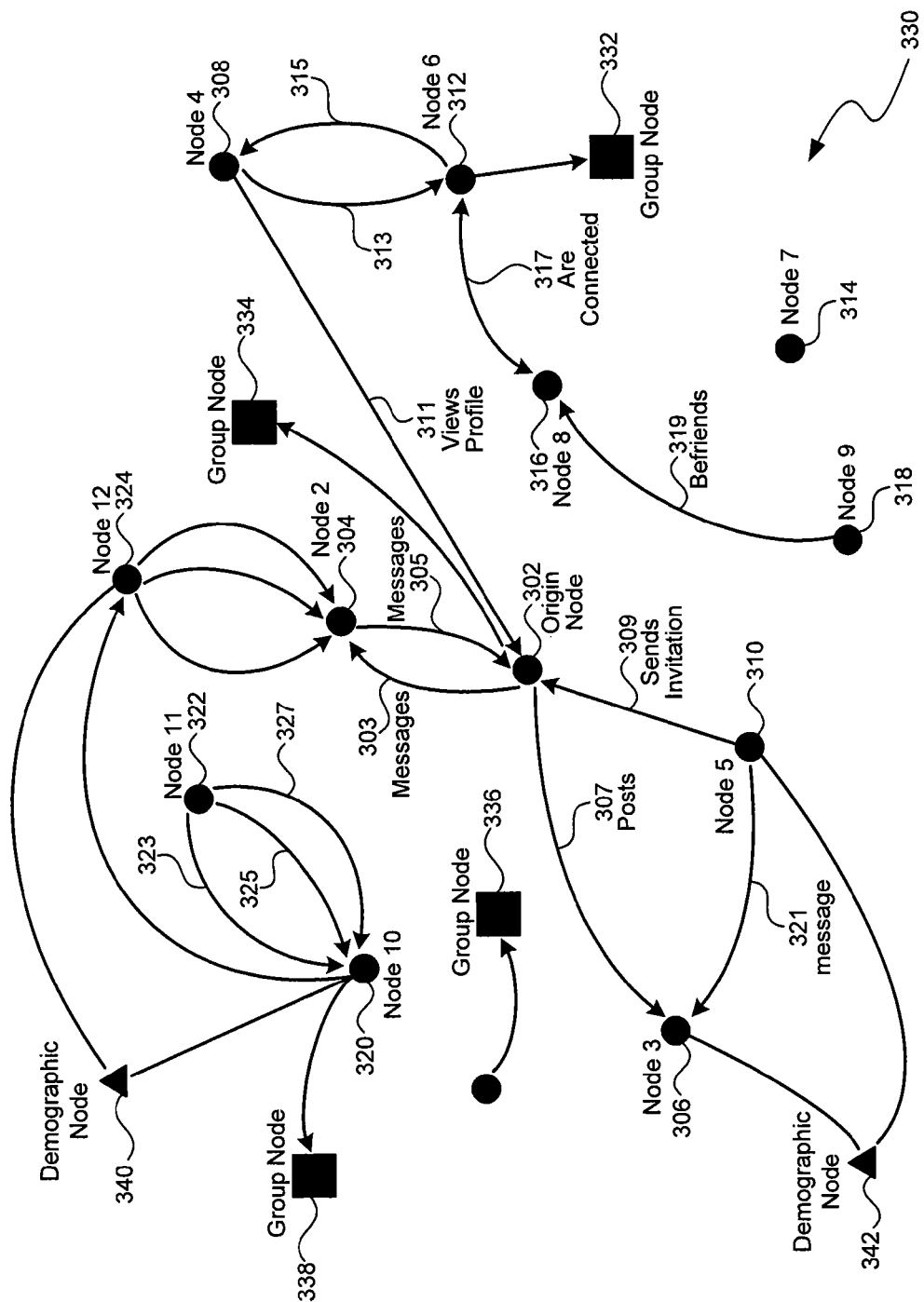
FIG. 3B depicts a diagram of another example representation of social interactions in a social network having multiple users and user groups, according to one embodiment.
Figure 3C:
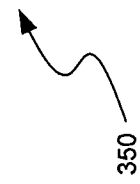
FIG. 3C illustrates an example table depicting the frequency counters, score, and rank, associated with each user node in a social network in an online environment, according to one embodiment.

FIG. 3B depicts a diagram of another example representation 330 of social interactions in a social network having multiple users and user groups, according to one embodiment.

In the representation 330, user groups are also represented as group nodes (e.g., group nodes 332, 334, 326, and 338). The group nodes can typically be connected to user nodes and other group nodes via edges as well. The representation 330 can also be used to generate relevancy scores, as discussed with reference to the example of FIG. 3A.

In one embodiment, the representation 330 can include demographic nodes (e.g., demographic nodes 340 and 342). Connections between user nodes and demographic nodes can be used to incorporate demographic information of the users in selecting relevant users. Demographic information represented by demographic nodes can include age, location, ethnicity, gender, any other demographic identifiers, or any combination of demographic identifiers. For example, a demographic node can be connected to users between the ages of 24-26 and located in the San Jose area. Demographic nodes are more frequently used for newer users who have had not that much contact with other users in the social network. For example, connections between user nodes and demographic nodes can be used as edges that can be traversed in the representation 330. Note that user nodes may be connected to any number of demographic nodes or none at all.

FIG. 5 illustrates an example user interface showing a user-profile page 500, according to one embodiment.

The user-profile page 500 can be displayed when a user logs on to the online social network. The user-profile page also includes the user's status update field 504. The user's profile information can be shown in fields 506 and 508. In field 506, the user's biographical information can be shown. In field 508, the user's interest and hobbies can be shown. For example, the use can provide information relating to favorite music types and artists, favorite movies, favorite TV shows, favorite books, favorite sports, and other interests. The user's updates or last few updates in the social network can be listed in field 510.

In the example shown, the user is able to access various features and services offered in the social network using the options provided in tab 502. In addition, the user may upload a photograph 512. For example, the options in tab 502 include selections allowing the user to access the home page, edit the profile, view friends, and/or review messages, etc. In addition, tab 502 includes an option for the user to play the "Meet Me" 550 application.

When the user selects the "Meet Me" 550 tab, the system launches an application that identifies other users that are relevant to the user. These identified users are generally not connections of the user. The user interfaces provided by the "Meet Me" application to facilitate the user to meet relevant users are illustrated with further references to FIG. 6A-6C.

Figure 6A:
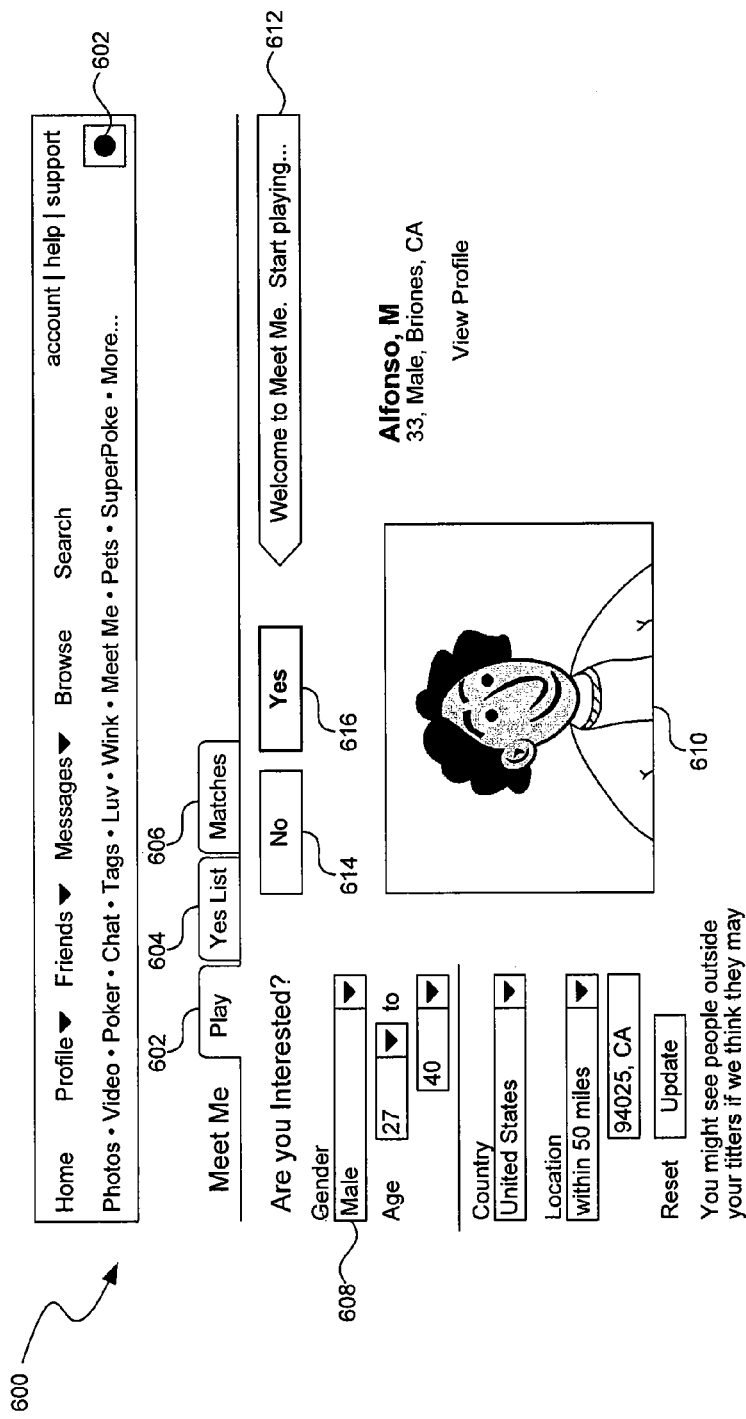
FIG. 6A illustrates an example user interface for the participating user to specify interest or a lack thereof in meeting a relevant user, according to one embodiment.

FIG. 6A illustrates an example user interface 600 for the participating user to specify interest or a lack thereof in meeting a relevant user, according to one embodiment.

When the user has selected the "Meet Me" tab, the user is presented with a picture 610 and a brief biography 612 of identified users that are relevant to the user and that the user may be interested in meeting. The user can specify demographic information of other users that they may want to meet. For example, in field 608, the user can specify the gender, age range, and geographical location of the people that they are interested in meeting or being introduced to. Based on these preferences and the user's social interactions, social connections, and/or social history with others in the online social network, the system identifies relevant users and presents them to the user. A photograph 610 and/or biographical information 612 of a relevant user may be presented in the application.

Figure 6B:
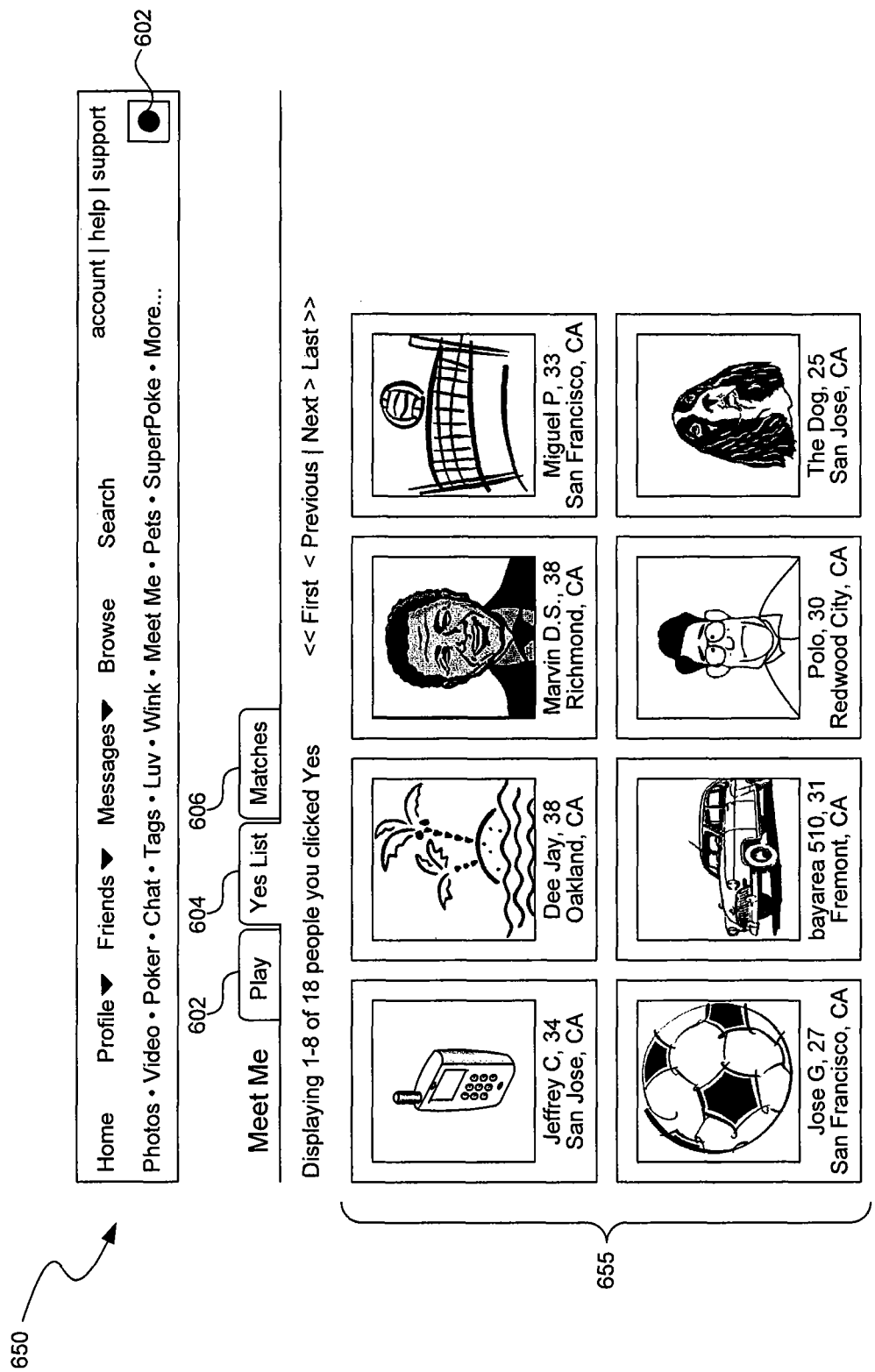
FIG. 6B illustrates an example user interface showing images and brief biography of the relevant users that the participating user has specified interest in, according to one embodiment.

In the Meet Me application, the user may select whether he or she is interested in meeting the relevant user. For example, the user can select "No" 614 to indicate lack of interest or "Yes" 616 to indicate interest. In one embodiment, once the user has indicated interest, the user may be presented with additional relevant users for the user to specify interest. The relevant users whom the user has indicated interest in meeting can be collectively displayed. For example, FIG. 6B illustrates an example user interface 650 showing images and brief biographies 655 of the relevant users that the participating user has indicated interest in, according to one embodiment. The user interface 650 can be displayed when the user clicks the "Yes List" tab 604.

Figure 6C:
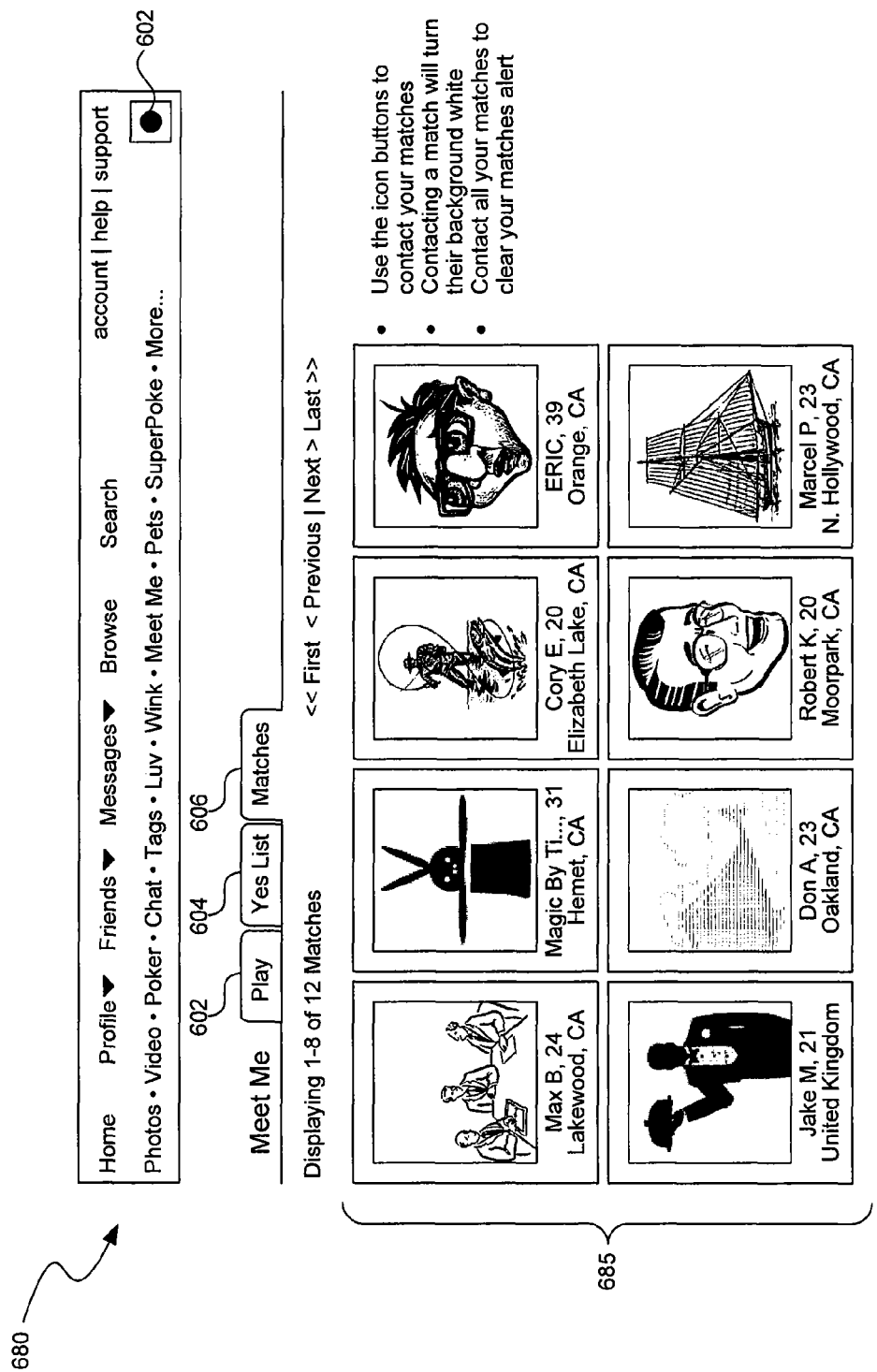
FIG. 6C illustrates an example user interface showing the relevant users that have indicated interest in the participating user, according to one embodiment.

FIG. 6C illustrates an example user interface 680 showing the relevant users that have indicated interest in the participating user, according to one embodiment.

In response to determining that the user is interested in meeting the relevant user, the system sends the relevant user an electronic notification indicating such interest. The electronic notification contains an indication of interest and is generally accessible by the relevant user using a user device (e.g., a portable phone, a computer, a laptop, a PDA, etc.). For example, notifications can be provided by lighting up an alert icon (e.g., an icon that appears in the upper panel in the user interface and/or on the home page that the user sees when signed in). The alert icon can be cleared after the user responds by participating in the "Meet Me" application.

The electronic notification (e.g., notification of interest) can take upon the form of an email, a text message, a voice message, or a combination of any of the above. When the relevant user responds to the electronic notification, the system can determine whether the relevant user is interested in meeting the participating user based on an indication made by the relevant user with the user device.

For example, the relevant user can also select, using 'Yes' and 'No' buttons. In one embodiment, in response to determining that the relevant user is also interested in meeting the participating user, the system sends the user (e.g. the user playing "Meet Me") an electronic notification that indicates interest of the relevant user. The electronic notification generally can be retrieved by the user using a user device or client device (e.g., a phone, an iPhone, a Blackberry, a computer, a laptop, a palmtop, etc.). For example, the relevant users that have also indicated interest may be listed under the "Matches" tab 606. Brief biographical data and images of relevant users of interest to the participating user (user playing "Meet Me") may be displayed when the "Matches" tab 606 is selected.

Figure 7A:
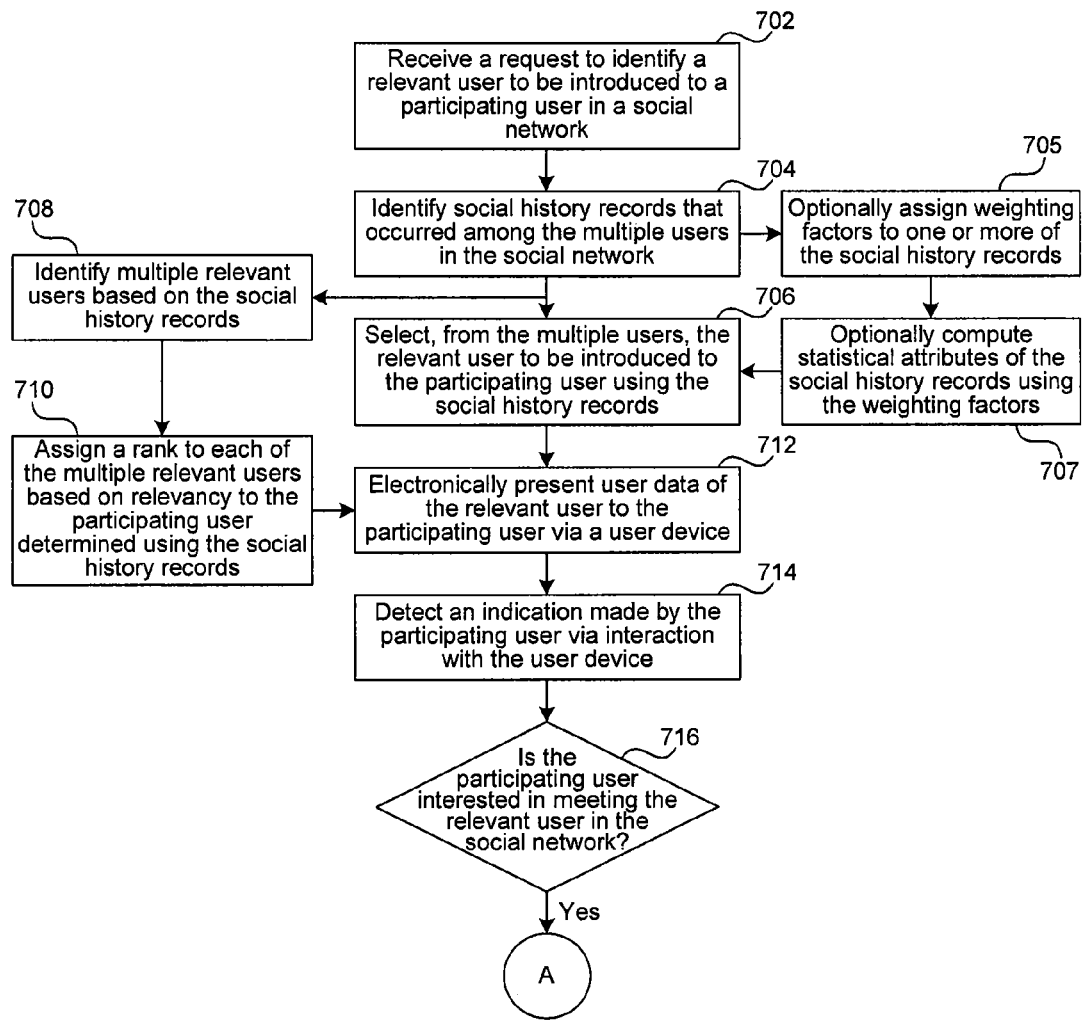
FIG. 7A-B depicts a flow diagram illustrating an example process for selecting one or more relevant users to be introduced to a participating user, according to one embodiment.
Figure 7B:
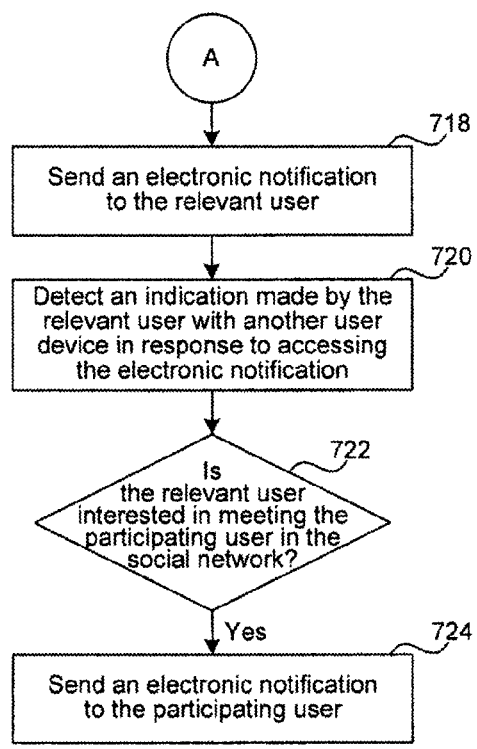

FIG. 7A-B depicts a flow diagram illustrating an example process for selecting one or more relevant users to be introduced to a participating user, according to one embodiment.

In process 702, a request to identify a relevant user to be introduced to a participating user in an online social network is received. The request may be made by the participating user using a web-interface (e.g., the user interfaces of FIG. 5-6) to the system that selects relevant users. The request may also be made via any other electronic or telephonic means (e.g., by sending a message, an email message, a voice message, a text message, and/or placing a call to one or more predetermined server locations). In one embodiment, the request is generated when the participating user selects to participate in a game in an online environment. For example, the user may select to participate in a game by initiating an application using a web-interface of an online social network (e.g., by selecting the "Meet Me" application through the web interface illustrated in the example of FIG. 5-6).

In process 704, a set of social history records that occurred among the multiple users in the social network is identified. Social history records can include social connections, social interactions, and/or actions performed by users or among users in the online social network. Any social record can be identified and recorded and further processed as suitable. The social records that can be identified and recorded for further process can include, by way of example, but not limitation, friendship connections, relationships of specified or unspecified types, associations with user groups, etc. The social records can also include interactions and actions such as viewing a profile, sending a message, receiving a message, reviewing a message, posting a comment. The social records can also include requesting selection of relevant users for introduction, sending a notification of interest, and/or responding to a notification of interest.

These social history records are used as information compiled about users and their preferences and thus used to for identifying relevant users that a participating user may like to be introduced to or meet in the online social network. In process 706, the relevant user to be introduced to the participating user using the set of social history records is selected from the multiple users.

In process 705, weighting factors are optionally assigned to one or more of the set of social history records. These weighting factors can be used in selecting relevant users in that certain types of interactions or connections may weight heavier in identifying potential users of interest to a particular user. For example, a higher weighting factor can be assigned to a sent or received message compared to a social connection or a relationship. In process 707, statistical attributes of the set of social history records are optionally computed using the weighting factors.

In addition to identifying a relevant user, in process 708, multiple relevant users can be identified based on the set of social history records. Each of the multiple relevant users may be presented simultaneously or sequentially to the participating user. The participating user may specify the number of relevant users to be identified and the number of whom to be presented.

In process 710, a rank is assigned to each of the multiple relevant users based on relevancy to the participating user determined using the set of social history records. In process 712, user data of the relevant user is electronically presented to the participating user via a user device. The multiple relevant users can be presented to the participating user in an order based on the ranking assigned to each of the relevant users. In addition, the multiple relevant users may be presented to the participating user in a randomized order. In addition, other users who have indicated interest (e.g., "Yes" notifications) to the participating user can also be mixed in to the set of relevant users that are presented.

In process 714, an indication made by the participating user via interaction with the user device is detected. In process 716, it is determined whether the participating user interested in meeting the relevant user in the social network based on the detected interaction. For example, the user may indicate 'interest' or 'no interest' in the selected relevant user by selecting (e.g., clicking) certain tabs and buttons in the user interface of the online social network (e.g., the example user interfaces of FIG. 5-6). Other mechanisms through which the user can indicate interest or no interest are contemplated. For example, the participating user may send a text message, an email, and/or a voice message to a predetermined web-location or physical location. If the participating user has indicated interest in meeting or being introduced to the relevant user, the process continues to process 718 of FIG. 7B.

In process 718, an electronic notification (e.g., a notification of interest) is sent to the relevant user. The notification may be sent in a text message, an online message, an email, a voice message, and/or a combination of the above for retrieval or review by the relevant user via a user or client device.

In process 720, an indication made by the relevant user with a user device is detected in response to accessing the electronic notification. In process 722, it is determined whether the relevant user is interested in meeting the participating user in the social network, using the detected indication. If so, in process 724, an electronic notification is sent to the participating user, that the relevant user is also interested in meeting and/or being introduced to the participating user. The message may be sent via email, a message in the online social network, a text message, and/or a voice mail.

In addition, the user information (e.g., biographical data, photograph) of the relevant users who have indicated interest may be collectively presented to the participating user in a webpage (e.g., the example user interface of FIG. 6C). The webpage may include links to initiate further dialogue or interaction including message exchange with these relevant users for the participating user to access via selection of web links.

Figure 8A:
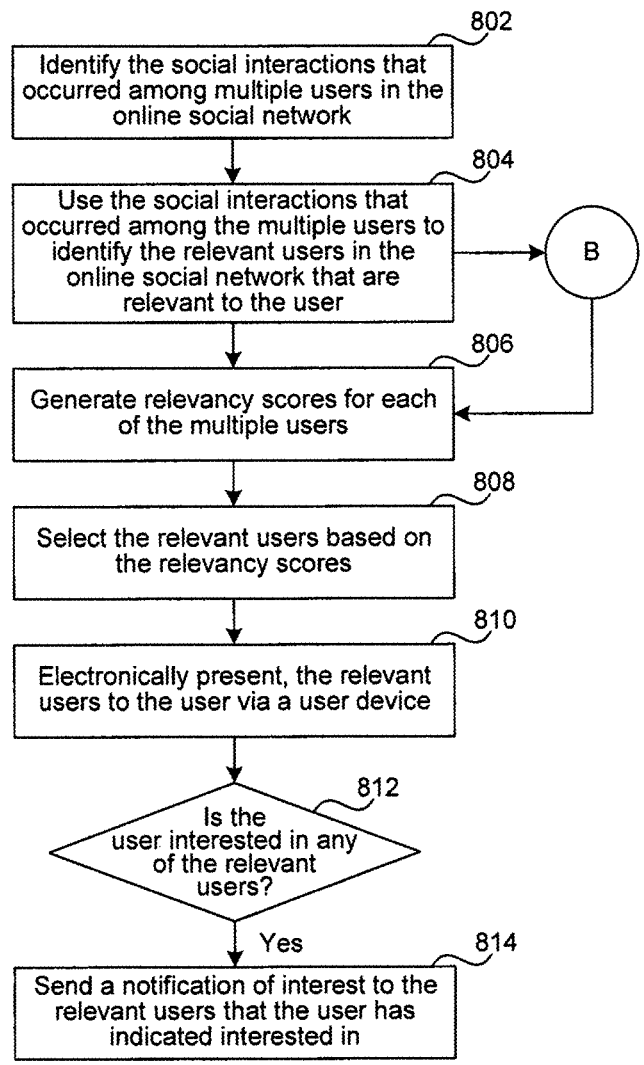
FIG. 8A depicts a flow diagram illustrating an example process for selecting relevant users using relevancy scores, according to one embodiment.

FIG. 8A depicts a flow diagram illustrating an example process for selecting relevant users using relevancy scores, according to one embodiment.

In process 802, the social interactions that occurred among multiple users in the online social network are identified. In process 804, the social interactions that occurred among the multiple users are used to identify the relevant users in the online social network that are relevant to the user. In process 806, relevancy scores for each of the multiple users are generated. Note that an example process flow with which relevancy scores are generated using social interactions is illustrated in FIG. 8B.

In process 808, the relevant users are selected based on the relevancy scores. In process 810, the relevant users are electronically presented to the user via a user device. In process 812, it is determined whether the user is interested in any of the relevant users. In process 814, a notification of interest is sent to the relevant users that the user has indicated interested in.

Figure 8B:
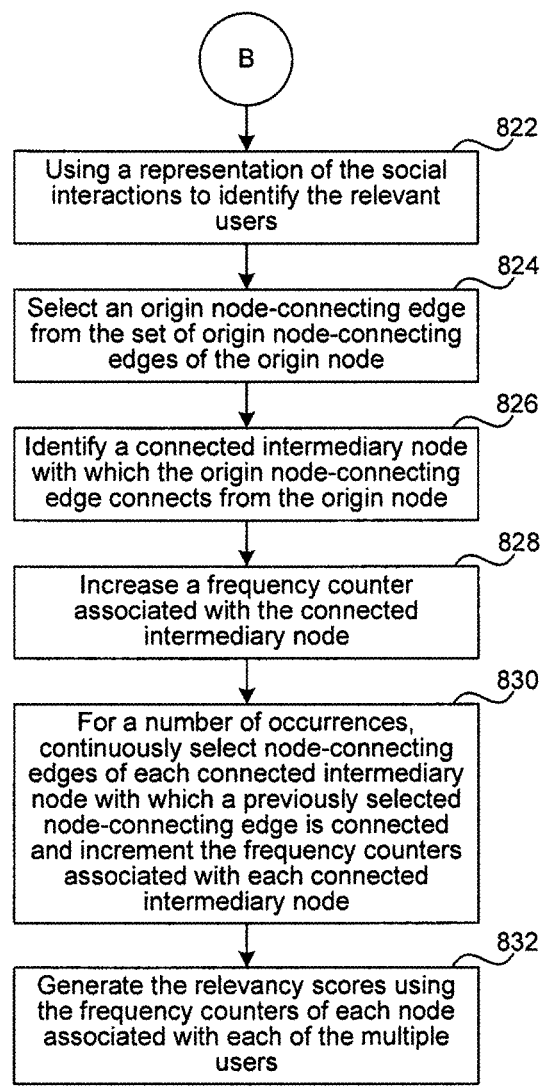
FIG. 8B depicts a flow diagram illustrating an example process for using a representation of social interactions in the online social network to generate relevancy scores, according to one embodiment.

FIG. 8B depicts a flow diagram illustrating an example process for using a representation of social interactions in the online social network to generate relevancy scores, according to one embodiment.

In process 822, a representation of the set of social interactions is used to identify the set of relevant users. In general, the set of social interactions also includes social connections. In the representation of social interactions, each of the multiple users in the online social network corresponds to a node, the user (e.g., the participating user) corresponds to an origin node, and the origin node corresponds to a set of origin node-connecting edges.

In process 824, an origin node-connecting edge is selected from the set of origin node-connecting edges of the origin node. The edge can be selected based on an assigned weighting factor or randomly. Weighting factors and the usage thereof are described with further reference to the examples of FIG. 3A-3D. In process 826, a connected intermediary node with which the origin node-connecting edge connects from the origin node is identified. In process 828, a frequency counter associated with the connected intermediary node is increased.

In process 830, for a number of occurrences, node-connecting edges of each connected intermediary node with which a previously selected node-connecting edge is connected are continuously selected and the frequency counters associated with each connected intermediary node are incremented. This process is also graphically depicted in the example diagrams of FIG. 3A-3B.

In process 832, the relevancy scores are generated using the frequency counters of each of the nodes associated with each of the multiple users. A higher relevancy score corresponds to a higher frequency counter and the relevancy scores can be used to select users relevant to a particular user (the user that is associated with the origin node in the social interaction representation.

Figure 9:
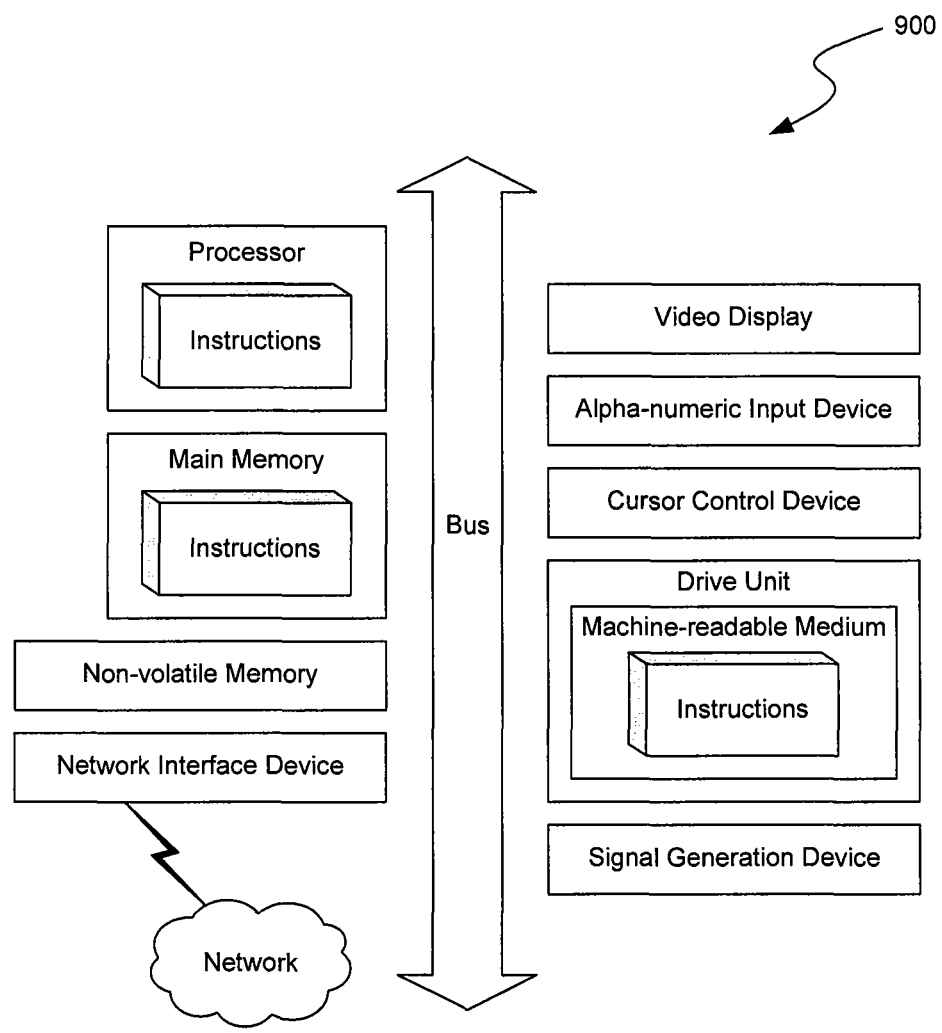
FIG. 9 shows a diagrammatic representation of a machine in the example form of a computer system within which a set of instructions, for causing the machine to perform any one or more of the methodologies discussed herein, may be executed, according to one embodiment.

FIG. 9 shows a diagrammatic representation of a machine in the example form of a computer system 900 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A system for ranking a set of relevant users based on relevancy scores associated with a particular user in an online social network, the system, comprising:
    a processor;
    an interaction manager module that works in coordination with the processor to identify a set of social interactions that occur among multiple users in the online social network, the set of social interactions being initiated by the multiple users via user devices;
    a representation generator that works in coordination with the processor to generate a representation of the set of social interactions, the representation including an origin node that corresponds to the particular user, the origin node corresponding to a set of origin node-connecting edges, intermediary nodes that correspond to the multiple users, each intermediary node having a frequency counter, and node-connecting edges that correspond to the set of social interactions;
    a node traversing module that works in coordination with the processor to:
        select an origin node-connecting edge from the set of origin node-connecting edges;
        identify a connected intermediary node with which the origin node-connecting edge connects from the origin node;
        increase the frequency counter associated with the connected intermediary node; and
        for a number of occurrences, continuously select the node-connecting edges of each connected intermediary node with which a previously selected node-connecting edge is connected and increment the frequency counters associated with at least a portion of the connected intermediary node, wherein the frequency counters are incremented for the connected intermediary nodes selected at odd number occurrences of the number of occurrences;
    a score generator module that works in coordination with the processor to generate a relevancy score for each of the multiple users based on the frequency counter associated with each of the multiple users;
    a selection module that works in coordination with the processor to select a set of relevant users based on the relevancy score; and
    a presentation module that works in coordination with the processor to send one or more of the set of relevant users to a user device for presentation to the particular user.

2. The system of claim 1, wherein the set of relevant users that are selected are not social connections connected with the particular user in the online social network.

3. The system of claim 1, wherein the set of social interactions comprises sending and receiving of a message.

4. The system of claim 1, wherein the set of social interactions comprises responding to and sending a notification of interest.

5. The system of claim 1, wherein the set of social interactions comprises viewing a profile, posting a comment, and sending an invitation.

6. The system of claim 1, wherein the score generator module works in coordination with the processor further to generate the relevancy score based on a search parameter.

7. The system of claim 6, wherein the search parameter depends on one or more of, demographics, a keyword, most recent activity online, and location.

8. The system of claim 7, wherein the relevancy score is generated as a weighted combination of the search parameter and the frequency counter.

9. A method of ranking a set of relevant users based on relevancy to a particular user in an online social network, comprising:

identifying, by a server of a computer system, a set of social interactions that occur among multiple users in the online social network, the set of social interactions being initiated by the multiple users via user devices;

identifying, by the server of the computer system, the set of relevant users in the online social network based on a representation of the set of social interactions among the multiple users, the representation including an origin node that corresponds to the particular user, the origin node corresponding to a set of origin node-connecting edges, intermediary nodes that correspond to the multiple users, each intermediary node having a frequency counter, and node-connecting edges that correspond to the set of social interactions, the identifying the set of relevant users including:

selecting an origin node-connecting edge from the set of origin node-connecting edges;

identifying a connected intermediary node with which the origin node-connecting edge connects from the origin node;

increasing the frequency counter associated with the connected intermediary node; and for a number of occurrences, continuously selecting the node-connecting edges of each connected intermediary node with which a previously selected node-connecting edge is connected and incrementing the frequency counters associated with at least a portion of the connected intermediary node, wherein the frequency counters are incremented for the connected intermediary nodes selected at odd number occurrences of the number of occurrences;

generating, by the server of the computer system, a relevancy score for each relevant user based on the frequency counter associated with each relevant user;

selecting, by the server of the computer system, one or more of the set of relevant users based on the relevancy score; and sending, by the server of the computer system, the one or more of the set of relevant users to a user device for presentation to the particular user.

10. The method of claim 9, wherein the set of relevant users that are selected are not social connections connected with the particular user in the online social network.

11. The method of claim 9, further comprising:

in response to determining that the particular user has indicated interest in one or more of the set of relevant users, sending, by the server of the computer system, a notification of interest to the one or more of the set of relevant users.

12. The method of claim 9, wherein the selection of the origin node-connecting edge is a first odd occurrence.

13. The method of claim 9, wherein, the set of social interactions comprises sending and receiving of a message.

14. The method of claim 13, wherein, the set of social interactions further comprises responding to and sending a notification of interest.

15. The method of claim 13, wherein, the set of social interactions further comprises, a friendship connection among the multiple users in the online social network.

16. The method of claim 13, wherein, the set of social interactions further comprises viewing a profile, posting a comment, and sending an invitation.

17. The method of claim 1, further comprising: generating, by the server of the computer system, the relevancy score based on a search parameter.

18. The method of claim 17, wherein, the search parameter depends on, one or more of, demographics, a keyword, most recent activity online, and location.

19. The method of claim 17, wherein, the relevancy score is generated as a weighted combination of the search parameter and the frequency counter.

* * * * *